Patented Nov. 12, 1935

2,020,937

UNITED STATES PATENT OFFICE 2,020,937

METHOD FOR PRODUCING CYCLICAL DISUBSTITUTED TETRAZOLES

Zoltán Földi, Budapest, Hungary, assignor to the firm Chinoin Gyógyszer-És Vegyeszeti Termekek Gyára R. T./Dr. Kereszty & Dr. Wolf, Ujpest, Hungary No Drawing. Application August 29, 1934, Serial No. 742,002. In Hungary September 2, 1933

2 Claims. (Cl. 260—44)

Various processes are known for converting derivatives of oximes as well as of ketones into cyclically di-substituted terazoles by means of hydrazoic acid or its salts.

It has now been discovered that aliphatic azido-compounds containing CN group can be converted by intra-molecular rearrangement into cyclically di-substituted tetrazoles. This rearrangement takes place according to the following equation:

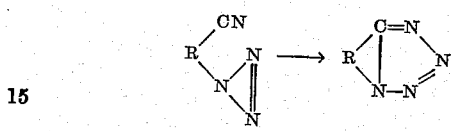

where R denotes a hydrocarbon radical which may also contain substituents.

Under the action of acid condensation agents, as e. g. sulphuric acid or chlorosulfonic acid, this intra-molecular rearrangement takes place already at ordinary temperature.

In view of the fact that the rearrangement is connected with a release of heat, it is advisable to carry out the process under cooling and in the presence of diluents.

The starting materials for the above reaction can be produced, among other methods, by heating halogenated alkyl-cyanides, as for instance ω-halogen-alkyl-cyanides with sodium-azide in the presence of diluents. The azido-alkyl-cyanides formed as a result of this reaction, are mostly oily materials and can be used for the intra-molecular rearrangement even without any further purification. The isolation of the final product of the intra-molecular rearrangement is effected in a manner per se known, for instance by extracting the tetrazole derivative from the alkalized reaction mixture by means of repeated shaking-out with chloroform.

By the new method, tetrazoles of the general formula

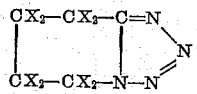

in which n stands for one of the numerals 3 and 4 can be produced, for example trimethylene-tetrazoles of the general formula

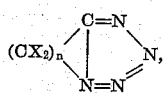

or tetramethylene-tetrazoles of the general formula

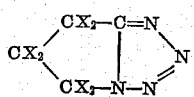

in which formulas any X represents either identical or different hydrocarbon radicals or hydrogen.

Examples 1. 110 g. of ω-azido-butyronitril (obtained from ω-chloro-butyronitril and sodium-azide; boiling point 55–60° C. at a pressure of 0.5 mm. Hg.) are diluted with 200 g. of chloroform and run into a stirred solution of 100 g. of chlorosulfonic acid in 500 g. of chloroform. The feed is controlled in such a manner that the temperature of the reaction mixture should be about 20–40° C. Stirring is continued during a few hours, following which the anorganic acids are neutralized by the careful addition of anhydrous soda. The filtrate separated from the precipitated salt is evaporated off. The dry residue, which in most cases crystallizes immediately and the quantity of which nearly corresponds to the theoretical yield, can be further purified by crystallization from alcohol. The melting point of the final product (trimethylene-tetrazole) is 110° C.

2. 110 g. of ω-azido-butyronitril diluted with carbon chloride are run at a temperature of about 30° C. into a mixture of 125 cc. of concentrated sulphuric acid and 150 cc. of carbon chloride, the liquid being permanently stirred. After the reaction has been completed, the liquid is poured on ice, the sulphuric acid precipitated by means of chalk and the trimethylene-tetrazole separated from the filtrate. The yield is nearly theoretical.

3. 15.2 grams of α-methyl-γ-azido-capronitril dissolved in 20 cc. of chloroform are dropped at a temperature of 30° C. into a stirred mixture of 12 cc. of fuming sulphuric acid and 20 cc. of chloroform. After stirring during a short time the liquid is poured on ice, the layer of chloroform is separated, dried on calcinated soda and the solvent evaporated. The residual oil is distilled at about 1 mm. Hg boiling at about 160° C. About 14 grams of product are obtained in the form of a colourless oil. This oil is the methyl-ethyl-trimethylene-tetrazole. It is moderately soluble in water.

4. From 124 grams of ω-azido-valeronitril by working as in Example 1 or 2, 100–112 grams of tetra-methylene-tetrazole are obtained. (Melting point: 115° C.)

5. From 15.2 grams of β-methyl-δ-azido-capronitril by working according to the process described in the preceding examples, 13 grams of dimethyl-tetramethylene-tetrazole can be produced, having a melting point of 95–96° C.

6. 16.8 grams of α-cyan-δ-azido-valeric-acid-ethyl-ester dissolved in chloroform are dropped at a temperature of 30–40° C. into a stirred mixture of 20 grams of chlorosulfonic acid and 30 cc. of chloroform. After some stirring the acids are neutralized by calcinated soda. After filtering, the chloroform solution is evaporated and the residual oil distilled at a pressure of 0.5 mm. Hg. Boiling point approximately 172° C. The distillate solidifies soon. Melting point 41° C. The product is the ethyl-ester of the tetramethylene-tetrazole-carboxylic-acid.

The products of the new process are distinguished by valuable therapeutical properties. Particularly efficacious are those tetrazole derivatives, which are substituted by one or more alkyl-groups, as, for instance the dimethyl-tetramethylene-tetrazole above described.

What I claim is:

1. The process for producing cyclically-disubstituted tetrazoles, comprising subjecting an azido-alkyl-cyanide of the general formula $N_3$—$(CX_2)_n$—CN, in which formula X stands for a member of the group hydrogen atom and alkyl and $n$ is one of the numerals 3 and 4, to the action of a strong inorganic acid.

2. As a new product of manufacture, a tetrazole of the general formula

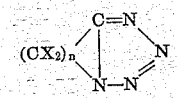

in which at least one X and at most two X's stand for an alkyl group, all other X's stand for hydrogen atoms, and $n$ is one of the numerals 3 and 4.

ZOLTÁN FÖLDI.